2,795,576

NEW MONOAZO-DYESTUFFS

Alfred Fasciati, Bottmingen, Switzerland, assignor to Ciba Limited, Basel, Switzerland, a firm of Switzerland No Drawing. Application July 26, 1954,
Serial No. 445,940

Claims priority, application Switzerland August 10, 1953

14 Claims. (Cl. 260—153)

This invention provides a process for the manufacture of valuable new monoazo-dyestuffs by coupling a diazo compound of the benzene series with a 5-pyrazolone capable of coupling in the 4-position, and so selecting the starting materials that the resulting monoazo-dyestuff contains at least one sulfonic acid group and a cyanuric acid radical bound to the dyestuff through an oxygen, sulfur or advantageously a nitrogen bridge, and which radical contains an exchangeable halogen atom and a substituent containing less than 13 carbon atoms.

The dyestuff components serving as starting materials, which contain a cyanuric acid radical having an exchangeable halogen atom, can be made by methods in themselves known by condensing 1 molecular proportion of a cyanuric trihalide with 1 molecular proportion of a dyestuff component, which contains in addition to a group capable of dyestuff formation a reactive hydrogen atom bound to an oxygen, sulfur or nitrogen atom, and by exchanging in a further condensation one of the two remaining halogen atoms in the cyanuric acid radical for the radical of a compound containing a reactive hydrogen atom and less than 13 carbon atoms. As such compounds containing less than 13 carbon atoms there come into consideration, for example, ammonia, aliphatic or aromatic hydroxy-compounds, mercaptans and above all organic nitrogen compounds, such as amines, amides, aminoalcohols, amino-acids, urethanes and the like. Thus, there are especially valuable in the present process diazo components of the benzene series, containing a cyanuric acid radical of the kind described above, for example, components of this kind obtainable from diamines of the benzene series by reacting the component with one molecular proportion of cyanuric chloride, and exchanging a chlorine atom still present in the resulting primary condensation product for the radical of a compound containing less than 13 carbon atoms as mentioned above. It is of advantage, however, to condense one molecular proportion of a cyanuric halide of the formula

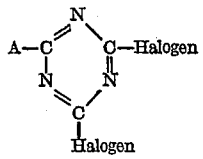

in which A represents a substituent containing less than 13 carbon atoms, with one molecular proportion of one of the following diamines of the benzene series: 4:4'-diaminodiphenyl - methane, 4:4'-dimethyl-3:3'-diamino-diphenyl-methane, 4:4'-diaminodiphenyl, 4:4'- or 2:4'-diamino-diphenyl ether, 4:4' - dichloro - 2:2' - diamino-diphenyl ether, 4:4'- or 2:2'-diaminodiphenyl sulfide, 2:4'- or 3:3'-diaminodiphenyl sulfone and (4':4''-di-amino-3':3''-dimethyl-diphenyl)-1:1'-cyclohexane. However, it is of advantage to use monocyclic diamines of the benzene series such as 1:4-diaminobenzene or 1:3-diaminobenzene. Especially valuable dyestuffs, which are fast to light, are obtained by using as the monocyclic diamine of the benzene series 1:4-diamino-benzene-3-sulfonic acid and above all 1:3-diamino-benzene-4-sulfonic acid.

It is often of advantage to start from monoamino- or mono-hydroxy-benzenes, which contain a substituent convertible into an amino group (for example a nitro or an acylamino group), which substituent may be converted after the condensation with the cyanuric halide into an amino group, for example, by reduction or by hydrolysis.

The condensations with the cyanuric halides are advantageously carried out in the presence of an acid-binding agent such as sodium acetate or sodium carbonate. In all these reactions it will be understood that the final product must contain one exchangeable halogen atom.

As examples of amines of which the diazo-compounds are used as starting materials in the present process, there may be mentioned:

(a) Secondary condensation products from 1 molecular proportion of one of the diamines mentioned above with 1 molecular proportion of cyanuric trichloride and 1 molecular proportion of one of the following compounds: Alcohols and phenols such as methyl, ethyl or butyl alcohol, phenol, ortho-, meta- or para-cresol, 4-secondary butyl-phenol, 4-tertiary amyl-phenyl, dialkyl-phenols, ortho-chlorophenol, para-chlorophenol, mercaptans such as dodecyl mercaptan, β-hydroxyethyl mercaptan, thiophenol, amines such as methylamine, dimethylamine, ethylamine, diethylamine, isopropylamine, butylamine, hexylamine, dodecylamine, phenylamine, ortho-tolylamine, 4-chlorophenylamine, 2-chlorophenyl-amine, N-methyl-phenylamine or cyclohexylamine, and also β-chlorethylamine, methoxymethylamine, ethanol-amine, acetamide, butyric acid amide, urea, thiourea, toluene sulfonamide, glycocoll, amino-carbonic acid esters, such as the methyl or ethyl ester, amino acetic acid ethyl ester, aminoacetamide, 1-aminobenzene-3- or -4-sulfonic acid or the corresponding sulfonamides or sulfones; and also the secondary condenation product of the formula

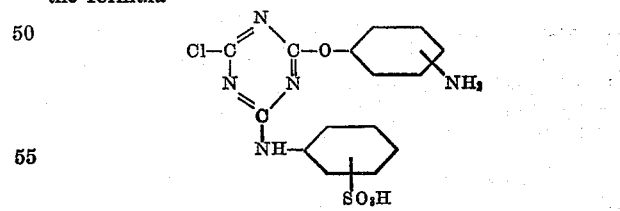

(b) There also come into consideration as diazo-components diazotized monoamines of the benzene series, which contain no cyanuric acid radicals. They are coupled only with coupling components, which contain a cyanuric acid radical of the kind described above.

As coupling components to be coupled only with the diazo-compounds of the amines mentioned under (a) above there may be mentioned: 1-phenyl-3-methyl-5-pyrazolone-2'- or -3'- or -4'-sulfonic acid, 1-(2'-chloro-phenyl)-3-methyl-5-pyrazolone-4'-sulfonic acid, 1-(2';5'- dichlorophenyl)-3-methyl-5-pyrazolone-4'-sulfonic acid, and advantageously 5-pyrazolones free from sulfonic acid groups, such as 3-methyl-5-pyrazolone, 5-pyrazolone-3-carboxylic acid butyl-amide, 3-phenyl-5-pyrazolone, 3-(2'-chlorophenyl)-5-pyrazolone, 1-(3'-chlorophenyl)-5-pyrazolone - 3 - carboxylic acid, 1 - phenyl - 3 - methyl-5-pyrazolone, 1-phenyl-3-methyl-5-pyrazolone-3'-sulfonic acid amide, 1-n-octyl-3-methyl-5-pyrazolone, 1:3-diphenyl-5-pyrazolone, 1-(3'- or 4'-chlorophenyl)-3-methyl-5-pyrazolone, and above all ortho-substituted 1-phenyl-3-methyl-5-pyrazolones such as 1-(2':5'-dichlorophenyl)-3-methyl-5-pyrazolone and especially 1-(2'-methyl- or 2'-chlorophenyl)-3-methyl - 5 - pyrazolone, 1 - (2'-ethylphenyl)-3-methyl-5-pyrazolone, 1-(2':6'-dichloro- or dimethyl-phenyl)-3-methyl-5-pyrazolone, 1-(2'-methyl-6'-chlorophenyl)-3-methyl-5-pyrazolone, which are to be coupled only with diazo-compounds containing a sulfonic acid group.

The diazotization of the amines serving as starting materials in the present process can be carried out by methods in themselves known, for example, with the aid of mineral acids, especially hydrochloric acid and sodium nitrite. The diazo-compounds so obtained are coupled with the aforesaid pyrazolones under conditions such that the exchangeable halogen present in the starting material does not react, that is to say, advantageously in a weakly acid to weakly alkaline medium, and at as low a temperature as possible.

In a modification of the process the aforesaid cyanuric acid radical is introduced not into the diazo component or coupling component used as starting material but into the monoazo-dyestuff. Thus, one molecular proportion of a monoazo-dyestuff, which contains a reactive hydrogen atom bound to an oxygen, sulfur or nitrogen atom, and, if necessary (see below), contains a sulfonic acid group, and corresponds to the formula (1)      R—N=N—Pz in which R represents a radical of a diazo compound of the benzene series, and Pz represents a 5-pyrazolone radical bound in the 4-position to the azo linkage, may be condensed with one molecular proportion of a cyanuric halide of the formula

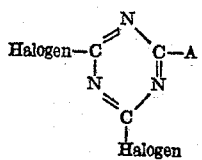

in which A represents a substituent containing less than 13 carbon atoms and must contain a sulfonic acid group if no sulfonic acid group is present in the monoazo-dyestuff used as starting material.

The dyestuffs of the Formula 1 can be made by methods in themselves known, for example, from diazo-compounds of the benzene series and 5-pyrazolones, which contain in addition to the diazo group a free amino, hydroxyl or mercapto group or a substituent convertible into such group.

The new valuable monoazo-dyestuffs of this invention contain at most two, and advantageously a single sulfonic acid group and correspond to the general Formula 2 R—N=N—Pz in which R represents the radical of an advantageously monocyclic diazo-compound of the benzene series, and Pz represents a 5-pyrazolone radical bound in the 4-position to the azo linkage, the dyestuff molecule also containing bound through an oxygen, sulfur or more especially a nitrogen bridge a radical of the formula (3)

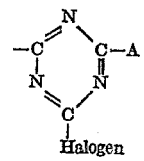

in which A represents a substituent containing less than 13 carbon atoms, especially an ortho-substituted phenylamino group.

Especially valuable are the monoazo-dyestuffs of the above constitution which contain a single sulfonic acid group and above all those in which the pyrazolone radical contains an ortho-substituted phenyl radical.

These new monoazo-dyestuffs are suitable for dyeing or printing a very wide variety of materials, especially nitrogenous textile materials such as silk, leather and above all wool, and also synthetic fibers of superpolyamides or superpolyurethanes. They are suitable for normal acid dyeing, for example with dyebaths containing acetic acid or sulfuric acid, and especially for dyeing from weakly alkaline, neutral or weakly acid baths, advantageously from a bath having a pH value within the range of 5–7. The dyeings and prints so produced are level and are distinguished by the special purity of their tints, by a good fastness to light and by excellent properties of fastness to washing and fulling, especially in the alkaline region.

The following examples illustrate the invention, the parts and percentages being by weight unless otherwise stated and the relationship of parts by weight to parts by volume being the same as that of the kilogram to the liter:

Example 1

39.3 parts of the secondary condensation product from 1 mol of cyanuric chloride, 1 mol of aniline and 1 mol of 1:3-diaminobenzene-4-sulfonic acid are suspended in 300 parts of water and 25 parts of hydrochloric acid of 30 percent strength, and diazotized at about 10–15° C. with 25 parts by volume of a 4 N-solution of sodium nitrite. The pale yellowish diazo-suspension so obtained is mixed first with 30 parts of sodium acetate (CH₃CO₂Na·3H₂O) and then at 10–15° C. slowly with a solution of 21.5 parts of 1-(2'-chlorophenyl)-3-methyl-5-pyrazolone in 104 parts by volume of a 1 N-solution of sodium hydroxide. When the coupling is finished the precipitated dyestuff is filtered off, washed with sodium chloride solution of 1 percent strength, and dried in vacuo. The dried dyestuff is a yellow powder which dissolves in hot water with a greenish yellow coloration and dyes wool and fibers of superpolyamides from a neutral or weakly acetic acid bath level greenish yellow tints which are fast to washing and fulling.

By using, instead of 1-(2'-chlorophenyl)-3-methyl-5-pyrazolone, the corresponding quantity of 3-methyl-5-pyrazolone there is obtained a dyestuff which dyes wool from a weakly acetic acid bath very level tints which are also greenish yellow, and the use of the isomeric condensation product from 1 mole of cyanuric chloride, 1 mol of aniline and 1 mol of 1:4-diaminobenzene-3-sulfonic acid, instead of the condensation product used in the first paragraph of this example, yields a dyestuff which dyes wool from a weakly acetic acid bath yellow-orange tints.

Yellow dyestuffs having similar properties are obtained by this method by using, instead of the diazo-components and coupling components given in this example those which are mentioned in columns I and II of the following table:

| | I<br>Diazo-components | II<br>Coupling components |
|---|---|---|
| 1 | phenyl-NH-C(=N-)N=C(Cl)-N=C-NH-phenyl(SO$_3$H)(NH$_2$) | 2-chloro-6-methylphenyl pyrazolone (HO-C=N-, HO-C-, C=N-CH$_3$) |
| 2 | phenyl-NH-C(=N-)N=C(Cl)-N=C-NH-phenyl(SO$_3$H)(NH$_2$) | 2,6-dimethylphenyl pyrazolone |
| 3 | phenyl-NH-C(=N-)N=C(Cl)-N=C-NH-phenyl(SO$_3$H)(NH$_2$) | 2-methylphenyl pyrazolone (with CH$_3$ on ring) |
| 4 | phenyl-NH-C(=N-)N=C(Cl)-N=C-NH-phenyl(SO$_3$H)(NH$_2$) | 2-ethylphenyl pyrazolone (C$_2$H$_5$) |
| 5 | phenyl-N(CH$_3$)-C(=N-)N=C(Cl)-N=C-NH-phenyl(SO$_3$H)(NH$_2$) | 2-chlorophenyl pyrazolone |
| 6 | 2-methoxyphenyl-NH-C(=N-)N=C(Cl)-N=C-NH-phenyl(SO$_3$H)(NH$_2$) (OCH$_3$) | 2-chlorophenyl pyrazolone |
| 7 | 2-methoxyphenyl-NH-C(=N-)N=C(Cl)-N=C-NH-phenyl(SO$_3$H)(NH$_2$) (OCH$_3$) | 2-chlorophenyl pyrazolone |
| 8 | 2,6-dimethoxyphenyl-NH-C(=N-)N=C(Cl)-N=C-NH-phenyl(SO$_3$H)(NH$_2$) | 2-chlorophenyl pyrazolone |
| 9 | 2-methyl-6-chlorophenyl-NH-C(=N-)N=C(Cl)-N=C-NH-phenyl(SO$_3$H)(NH$_2$) | 2-methyl-6-chlorophenyl pyrazolone (CH$_3$, Cl) |

| | I<br>Diazo-components | II<br>Coupling components |
|---|---|---|
| 10 | 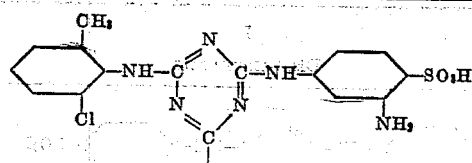 | 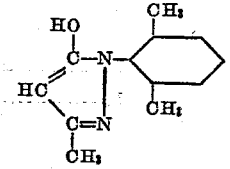 |
| 11 | 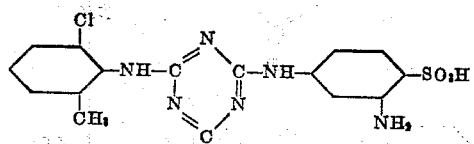 | 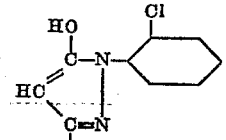 |
| 12 | 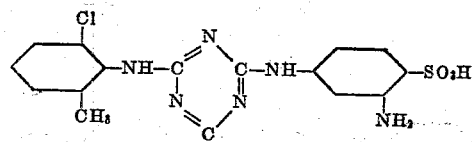 | 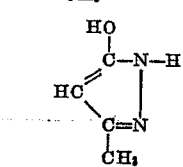 |
| 13 | 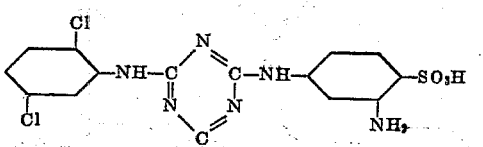 | 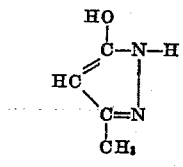 |
| 14 | 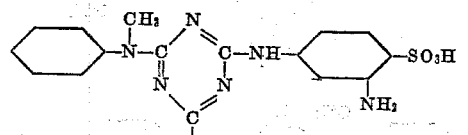 | 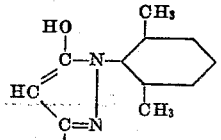 |
| 15 | 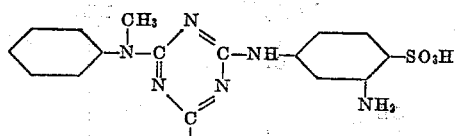 | 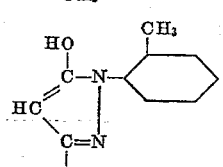 |
| 16 | 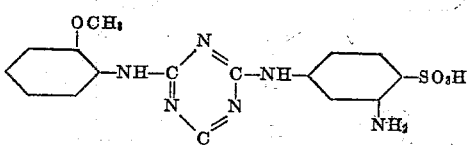 | 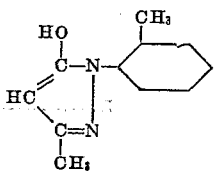 |
| 17 | 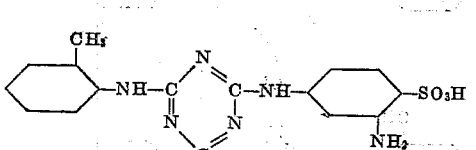 | 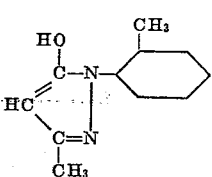 |
| 18 | 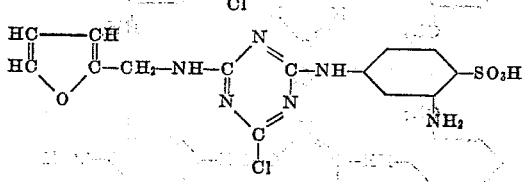 | 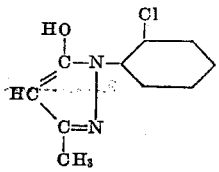 |

|     | I<br>Diazo-components | II<br>Coupling components |
| --- | --- | --- |
| 19 | (chemical structure) | (chemical structure) |
| 20 | (chemical structure) | (chemical structure) |
| 21 | (chemical structure) | (chemical structure) |
| 22 | (chemical structure) | (chemical structure) |
| 23 | (chemical structure) | (chemical structure) |
| 24 | (chemical structure) | (chemical structure) |
| 25 | (chemical structure) | (chemical structure) |
| 26 | (chemical structure) | (chemical structure) |
| 27 | (chemical structure) | (chemical structure) |
| 28 | (chemical structure) | (chemical structure) |

| | I<br>Diazo-components | II<br>Coupling components |
|---|---|---|
| 29 | Structure: S–C (triazine ring with N's) –NH–(benzene)–SO₃H, with NH₂ on benzene, Cl on triazine, and (CH₂)₁₁CH₃ on S | HO–C(=N–phenyl–Cl)–C(CH₃)=N (pyrazolone with chlorophenyl) |
| 30 | Condensation product from 7.8 parts of β-hydroxyethyl mercaptan, 18.4 parts cyanuric chloride and 18.8 parts of 1,3-diaminobenzene-4-sulfonic acid. | HO–C(=N–phenyl–Cl)–C(CH₃)=N (pyrazolone with chlorophenyl) |
| 31 | Structure: cyclohexyl–S–C (triazine) –NH–(benzene)–SO₃H, with NH₂ on benzene, Cl on triazine | HO–C(=N–phenyl–Cl)–C(CH₃)=N (pyrazolone with chlorophenyl) |
| 32 | Structure: phenyl–NH–C (triazine) –NH–(benzene)–SO₃H, with NH₂ on benzene, Cl on triazine | HO–C(=N–phenyl(Cl,Cl)–SO₃H)–C(CH₃)=N (pyrazolone with dichloro-sulfo-phenyl) |

The cyanuric chloride condensation product used as diazo component for making the dyestuff No. 25 can be prepared, for example, as follows:

173 parts of 1-aminobenzene-4-sulfonic acid are dissolved in 40 parts by volume of a solution of sodium hydroxide of 30 percent strength and 800 parts of water, and the solution is added to a fine suspension of 185 parts of cyanuric chloride in 5000 parts of ice water. After stirring the mixture for a few hours it is warmed to 25–30° C. An acetone solution of 108 parts of metaphenylene diamine is then added at about 30° C. A concentrated solution of sodium carbonate is simultaneously introduced dropwise, so that the reaction mixture is maintained weakly alkaline to Brilliant Yellow paper. When the reaction is finished the mixture is acidified with hydrochloric acid, and the secondary condensation product is precipitated by the addition of sodium chloride and filtered off. It can be used directly in the form of the filter paste for producing the dyestuff.

The cyanuric chloride condensation product used for preparing dyestuff No. 6 may be prepared, for example, as follows:

18.4 parts of cyanuric chloride are dissolved in 100 parts of acetone, and cooled by external cooling to −5° C. 10.7 parts of ortho-toluidine in 100 parts of acetone are then introduced dropwise, while cooling so that the temperature does not exceed 0° C. 8.5 parts of finely pulverized sodium bicarbonate are then added and the whole is stirred. The temperature should increase to 20–25° C. in the course of 3–5 hours. 18.8 parts of metaphenylene diamine sulfonic acid in the form of its sodium salt are then dissolved in 100 parts of water at 30° C. and added to the acetone suspension. 50 parts by volume of a 4N-solution of sodium acetate are then added and the whole is stirred for 15 hours at 30° C. The condensation product partially precipitates. After distilling off the acetone under reduced pressure the suspension is rendered acid to Congo with hydrochloric acid. The di-condensation product is filtered off and washed with a small amount of ice water. It can be used directly in the paste form for producing the dyestuff.

The condensation product used for preparing dyestuff No. 5 in the table is obtained in the same manner from 10.7 parts of N-methyl-aniline, instead of 10.7 parts of ortho-toluidine, and the cyanuric chloride derivative for preparing dyestuff No. 7, is made from 12.3 parts of ortho-anisidine.

The condensation product used for preparing dyestuff No. 29 is also obtained by these methods by using 21.4 parts of dodecylmercaptan and 16 parts of sodium bicarbonate.

In an analogous manner the other cyanuric chloride condensation product used as diazo components can be prepared.

*Example 2*

27.5 parts of 1-acetylamino-3-aminobenzene-4-sulfonic acid are coupled in the usual manner with 1-(2′-chlorophenyl)-3-methyl-5-pyrazolone. The resulting dyestuff is precipitated by the addition of hydrochloric acid and heated for 2 hours in hydrochloric acid of 15 percent strength under reflux in order to hydrolyze the acetyl group. After cooling the mixture it is filtered. The still moist finely dispersed dyestuff is added at 0–5° C. to a fine suspension of 18.5 parts of cyanuric chloride. By the addition of a dilute solution of sodium carbonate the reaction is continuously maintained weakly alkaline to Brilliant Orange. 9.3 parts of aniline are then added and the mixture is heated to 30–35° C. By the addition of sodium carbonate solution the reaction is continuously maintained weakly alkaline to Brilliant Yellow paper. After a few hours the resulting suspension is filtered and the filter residue is washed with dilute sodium chloride solution. The dried dyestuff is a yellow powder which dissolves in water with a yellow coloration, and dyes wool from a weakly acid bath pure green-yellow tints.

Example 3

2 parts of the dyestuff obtained as described in Example 1 are dissolved in 4000 parts of water, 10 parts of crystalline sodium acetate are added to the dyebath, and 100 parts of wool are entered at 40–50° C. 2 parts of acetic acid of 40 percent strength are then added, the bath is raised to the boil in the course of ½ hour and dyeing is carried on for ¾ hour at that temperature. After rinsing and drying the material, there is obtained a greenish yellow dyeing which is fast to light and possesses very good fastness to washing and fulling.

The same result is obtained without the addition of acetic acid to the dyebath. When superpolyamide fibers, instead of wool, are dyed there is likewise obtained a greenish yellow dyeing which is fast to light.

What is claimed is:

1. A monoazo dyestuff containing a single sulfonic acid group and corresponding to the formula

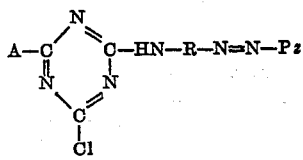

in which R represents a monocyclic radical of the benzene series, Pz represents a 5-pyrazolone radical bound in its 4-position to the azo linkage and A represents a substituent containing less than 13 carbon atoms, which is bound through a member selected from the class consisting of an —O—, an —S— and a nitrogen bridge to the triazine nucleus and contains at most one monocyclic nucleus.

2. A monoazo dyestuff containing a single sulfonic acid group and corresponding to the formula

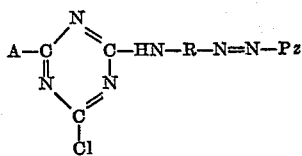

in which R represents a monocyclic radical of the benzene series, Pz represents a 5-pyrazolone radical bound in its 4-position to the azo linkage and A represents a substituent containing less than 13 carbon atoms, which is bound through a member selected from the class consisting of an —O—, an —S— and a nitrogen bridge to the triazine nucleus, the sulfonic acid group being present in one of the radicals A and R.

3. A monoazo dyestuff containing a single sulfonic acid group and corresponding to the formula

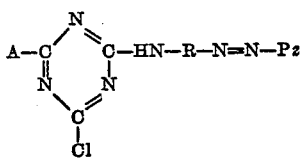

in which R represents a monocyclic radical of the benzene series, Pz repersents a 5-pyrazolone radical bound in its 4-position to the azo linkage and A represents a monocyclic arylamino group of the benzene series and the sulfonic acid group is present in one of the radicals A and R.

4. A monoazo dyestuff containing a single sulfonic acid group and corresponding to the formula

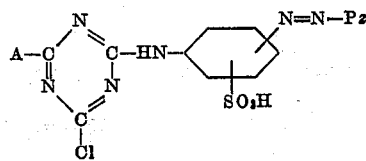

in which Pz represents a 5-pyrazolone radical bound in its 4-position to the azo linkage and A represents a monocyclic arylamino group of the benzene series.

5. A monoazo dyestuff containing a single sulfonic acid group and corresponding to the formula

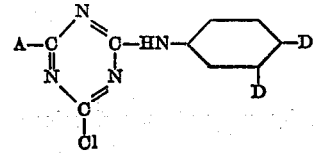

in which A represents a monocyclic arylamino group of the benzene series one D represents a sulfonic acid group and the other D represents a radical of the formula

wherein Pz stands for a 3-methyl-5-pyrazolone radical bound in its 4-position to the azo linkage.

6. A monoazo dyestuff containing a single sulfonic acid group and corresponding to the formula

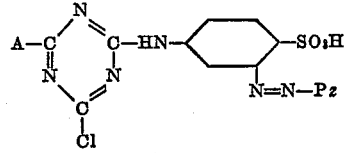

in which Pz represents 3-methyl-5-pyrazolone radical bound in its 4-position to the azo linkage and A represents a monocyclic arylamino group of the benzene series.

7. A monoazo dyestuff containing a single sulfonic acid group and corresponding to the formula

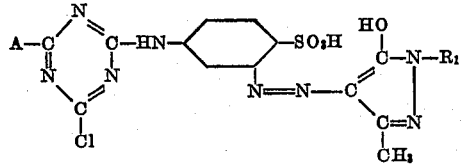

in which A represents a monocyclic arylamino group of the benzene series and $R_1$ represents a monocyclic radical of the benzene series.

8. A monoazo dyestuff containing a single sulfonic acid group and corresponding to the formula

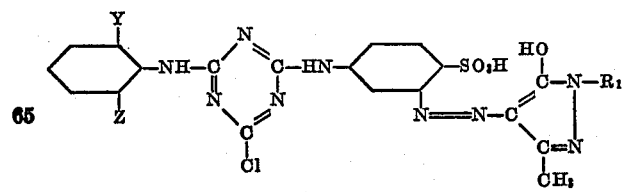

in which Y and Z each represents a member selected from the group consisting of a hydrogen atom, a chlorine atom, an alkyl group containing at the most two carbon atoms and an alkoxy group containing at the most two carbon atoms and $R_1$ represents a monocyclic radical of the benzene series.

9. A monoazo dyestuff containing a single sulfonic acid group and corresponding to the formula

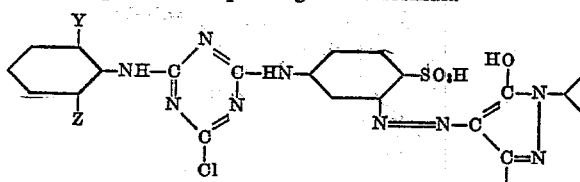

in which A represents a member selected from the group consisting of a hydrogen atom, a chlorine atom, an alkyl group containing at the most two carbon atoms, B represents a member selected from the group consisting of a chlorine atom, and an alkyl group containing at the most two carbon atoms, Y and Z each represents a member selected from the group consisting of a hydrogen atom, a chlorine atom, an alkyl group containing at the most two carbon atoms and an alkoxy group containing at the most two carbon atoms.

10. The monoazo dyestuff of the formula

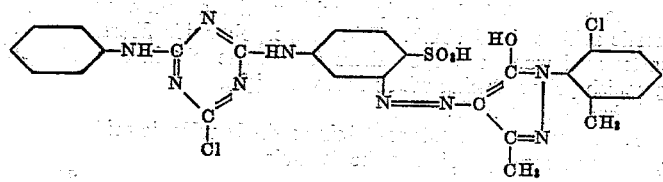

11. The monoazo dyestuff of the formula

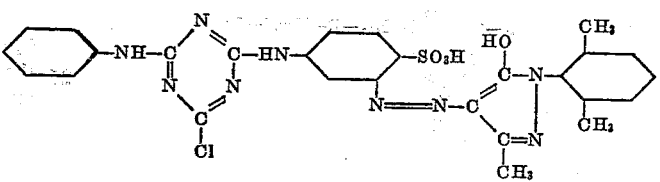

12. The monoazo dyestuff of the formula

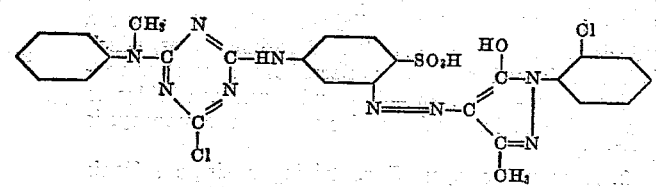

13. The monoazo dyestuff of the formula

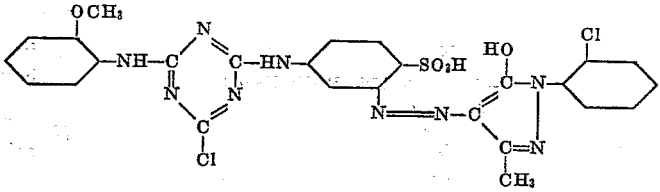

14. The monoazo dystuff of the formula

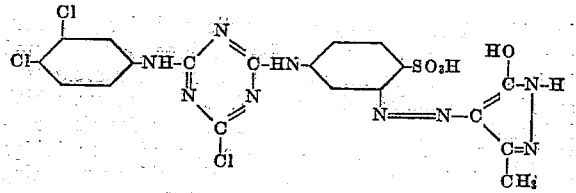

References Cited in the file of this patent
FOREIGN PATENTS
486,660    Great Britain _____ June 7, 1938